United States Patent
Koncelik, Jr.

(10) Patent No.: US 7,091,842 B2
(45) Date of Patent: Aug. 15, 2006

(54) FOUR WHEEL DRIVE ALERT

(76) Inventor: Lawrence J. Koncelik, Jr., 10 Gingerbread La., East Hampton, NY (US) 11937

( * ) Notice: Subject to any disclaimer, the term of this patent is extended or adjusted under 35 U.S.C. 154(b) by 435 days.

(21) Appl. No.: 10/770,597

(22) Filed: Feb. 3, 2004

(65) Prior Publication Data

US 2004/0140889 A1 Jul. 22, 2004

(51) Int. Cl.
*B60Q 1/00* (2006.01)

(52) U.S. Cl. .................. 340/456; 340/425.5; 340/438; 340/457

(58) Field of Classification Search ............. 340/456, 340/425.5, 438, 309.16, 441, 457
See application file for complete search history.

(56) References Cited

U.S. PATENT DOCUMENTS

| | | | | |
|---|---|---|---|---|
| 4,423,366 A | * | 12/1983 | Gottwald | 318/696 |
| 4,771,850 A | * | 9/1988 | Matsuda | 180/197 |
| 4,784,236 A | * | 11/1988 | Bausch et al. | 180/249 |
| 5,016,724 A | * | 5/1991 | Steinhagen et al. | 180/197 |
| 5,202,830 A | * | 4/1993 | Tsurumiya et al. | 701/41 |
| 5,510,585 A | * | 4/1996 | Duve et al. | 200/35 R |
| 5,623,247 A | | 4/1997 | Cardillo | 340/457 |
| 5,695,021 A | * | 12/1997 | Schaffner et al. | 180/208 |
| 5,950,785 A | * | 9/1999 | Adachi et al. | 192/69.41 |
| 6,039,138 A | * | 3/2000 | Sugimoto et al. | 180/245 |
| 6,101,439 A | * | 8/2000 | Cutting et al. | 701/64 |

* cited by examiner

*Primary Examiner*—Daryl C Pope
(74) *Attorney, Agent, or Firm*—Walter J. Tencza, Jr.

(57) ABSTRACT

An apparatus is disclosed comprising an audio alert device, a timer, a processor; and a four-wheel drive device for a subject vehicle. The processor may activate the timer when the four-wheel drive device indicates that the subject vehicle has been placed in a four-wheel drive state. The processor may activate the audio alert device so that the audio alert device produces a sound when the timer has reached a limit. The apparatus may include a distance counter. The processor may activate the distance counter when the four-wheel drive device indicates that the subject vehicle has been placed in a four-wheel drive state. The processor may activate the audio alert device so that the audio alert device produces a sound when the distance counter has reached a limit.

16 Claims, 3 Drawing Sheets

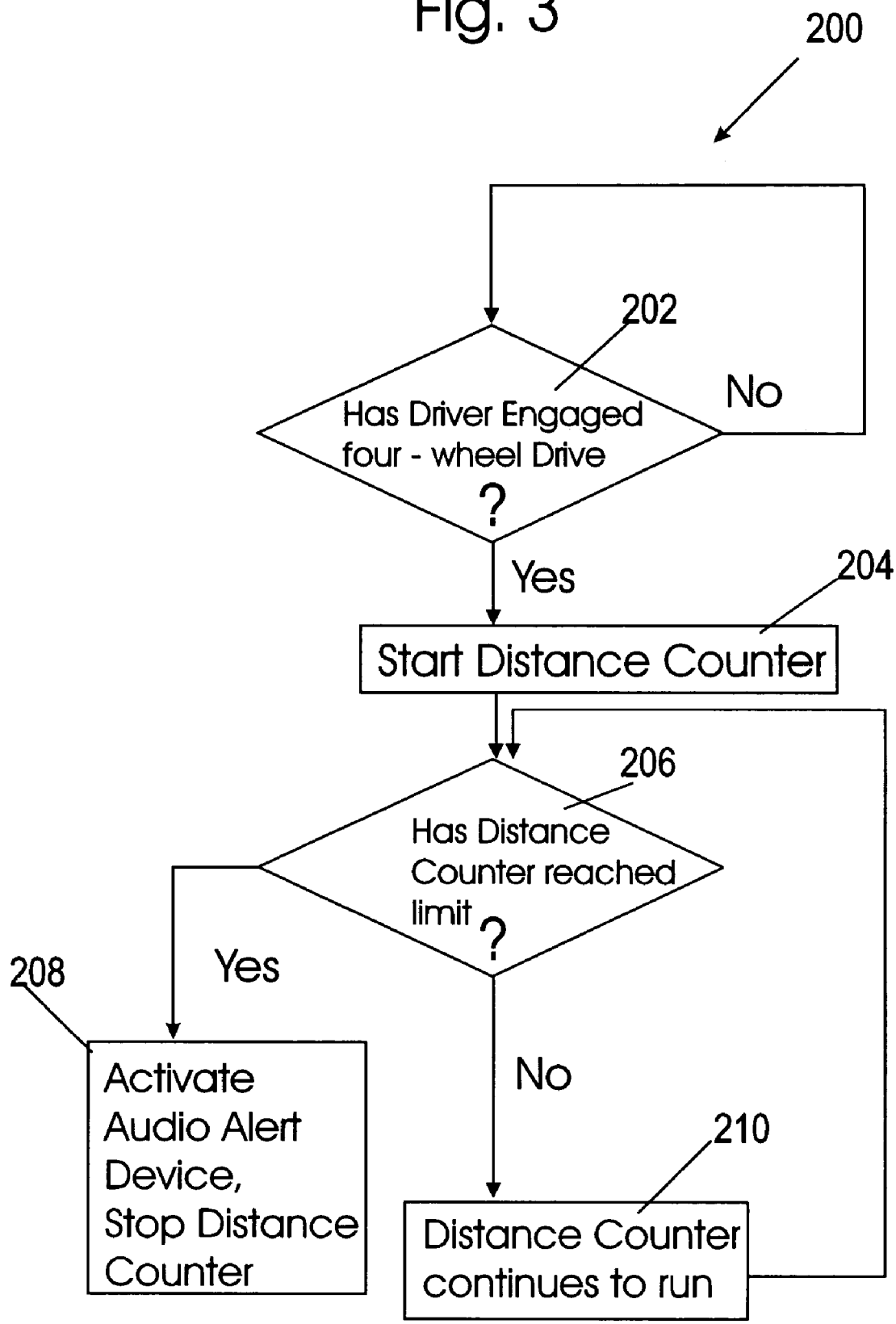

FOUR WHEEL DRIVE ALERT

FIELD OF THE INVENTION

This invention relates to improved methods and apparatus concerning the use of four-wheel drive for a vehicle.

BACKGROUND OF THE INVENTION

Often when driving a four wheel drive vehicle on snowy or icy roadways, a driver will engage a switch or lever to put his or her vehicle in four wheel drive. The driver will often drive the car for any number of miles, totally oblivious to the fact that it is in four wheel drive when, perhaps there is no longer any need that it be in four wheel drive. Driving a car in while it is in four wheel drive causes greater gas consumption, creates more wear and tear on the vehicle, and is more sluggish than driving when in two wheel drive. The current visual alert on four wheel drive buttons do not always serve to remind the driver that he or she might be in four wheel drive because there are so many lights on a dashboard that one particular light might not draw enough attention.

SUMMARY OF THE INVENTION

The present invention, in one or more embodiments, includes an apparatus comprising an audio alert device, a timer, a processor; and a four wheel drive device for a subject vehicle. The processor may activate the timer when the four-wheel drive device indicates that the subject vehicle has been placed in a four-wheel drive state. The processor may activate the audio alert device so that the audio alert device produces a sound when the timer has reached a limit. The limit may be zero and the timer may count down to reach the limit. The limit may be a value and the timer may count up to reach the limit. The apparatus may further include an ignition device for starting the subject vehicle. The processor may reset the timer to a start value when the ignition device is turned off.

In one embodiment the apparatus may include a distance counter. The processor may activate the distance counter when the four-wheel drive device indicates that the subject vehicle has been placed in a four-wheel drive state. The processor may activate the audio alert device so that the audio alert device produces a sound when the distance counter has reached a limit. The limit may be zero and the distance counter may count down with distance traveled by the subject vehicle to reach the limit. The limit may be a value and the distance counter may count up with distance traveled by the subject vehicle to reach the limit. The processor may reset the distance counter to a start value when an ignition device of the subject vehicle is turned off.

BRIEF DESCRIPTION OF THE DRAWINGS

FIG. 3 shows a flow chart of another method in accordance with another embodiment of the present invention.

DETAILED DESCRIPTION OF THE DRAWINGS

Figure 1:
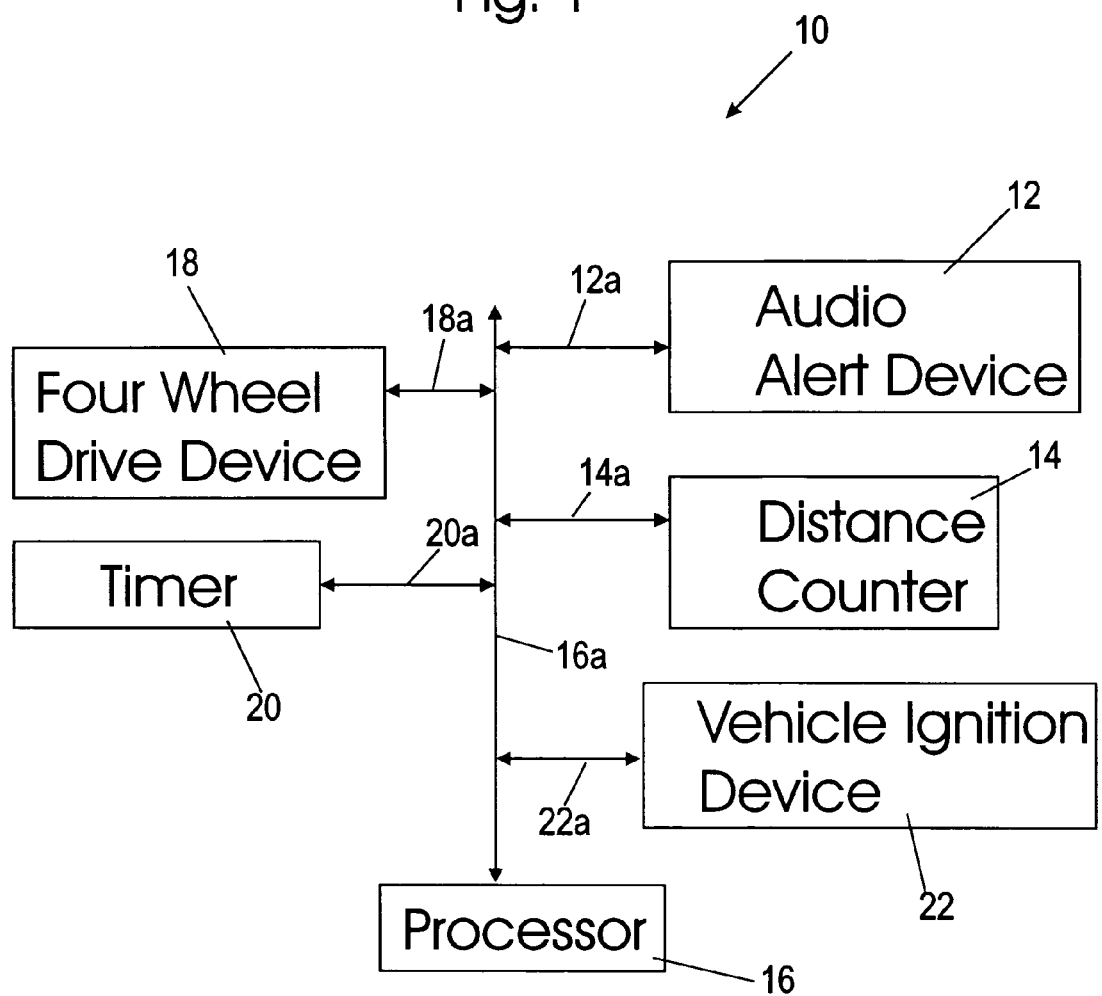
FIG. 1 shows a block diagram of an apparatus in accordance with an embodiment of the present invention.

FIG. 1 shows a block diagram of an apparatus 10 in accordance with an embodiment of the present invention.

The apparatus 10 includes an audio alert device 12, a distance counter 14, a processor 16, a four-wheel drive device 18, a timer 20, and a vehicle ignition device 22. The audio alert device 12, the distance counter 14, the four wheel drive device 18, the timer 20, and the vehicle ignition device 22 may be electrically connected to a bus 16a of the processor 16, and thus to the processor 16, by busses 12a, 14a, 18a, 20a, and 22a respectively. The busses 12a, 14a, 16a, 18a, 20a, and/or 22a may provide electrical connection or communication by hardwired, optical, wireless, or any other means. The apparatus 10 and its components may be located on or in a subject vehicle, such as an automobile.

Figure 2:
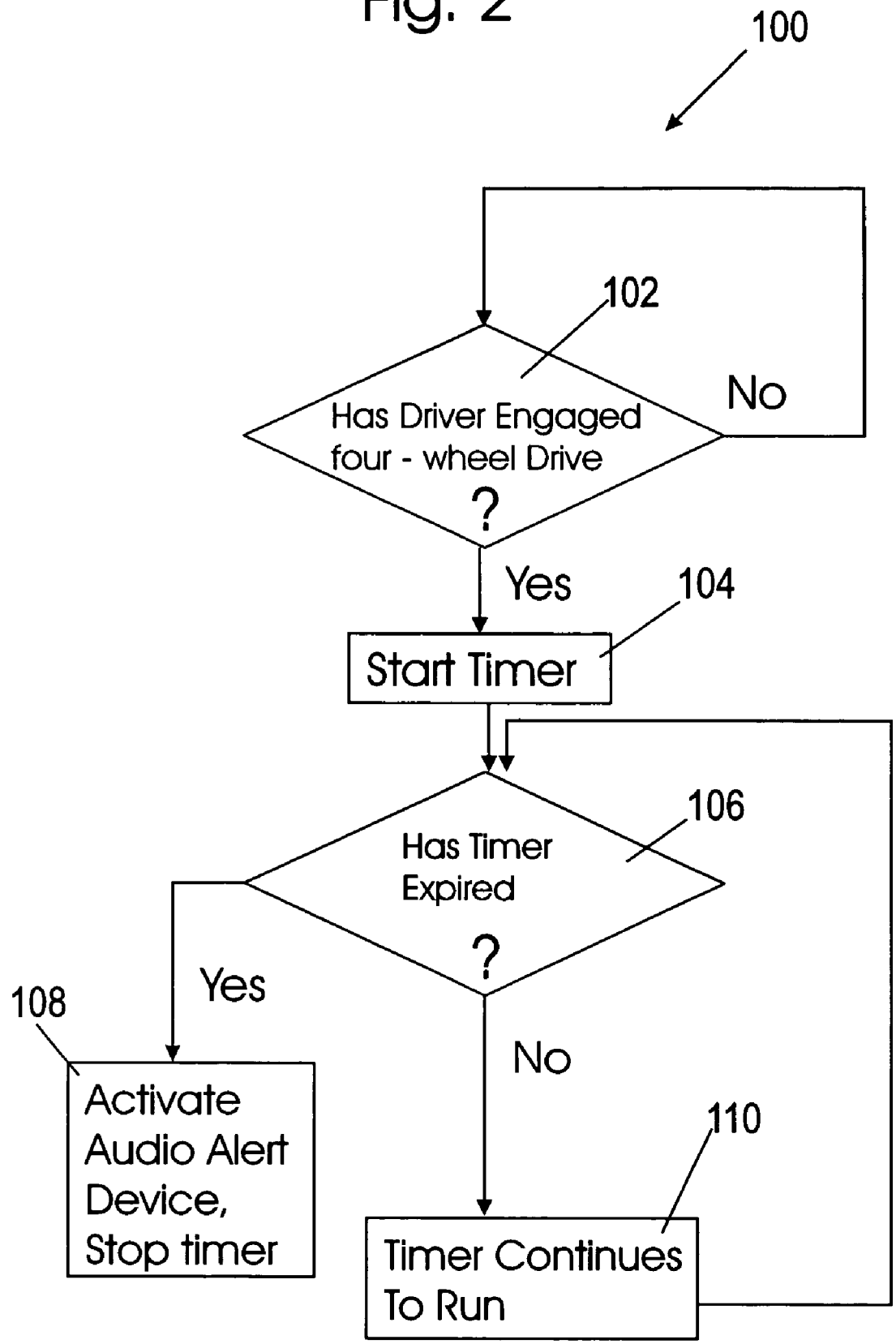
FIG. 2 shows a flow chart of a method in accordance with an embodiment of the present invention.

FIG. 2 shows a flow chart 100 of a method in accordance with an embodiment of the present invention. At step 102 the processor 16 may determine if a driver of the subject vehicle has engaged four-wheel drive. The processor 16 may receive a signal from the four-wheel drive device 18 over busses or communications lines 18a and 16a from the four wheels drive device 18. If the driver of the subject vehicle has not engaged four-wheel drive, the processor 16 periodically repeats step 102 until the driver engages four-wheel drive.

If the driver of the subject vehicle has engaged four-wheel drive, a signal is sent from the four-wheel drive device 18 to the processor 16 indicating that four-wheel drive has been engaged. In response to this signal, the processor 16 starts the timer 20 at step 104. The timer 20 may, for example, start at zero and count up to a limit or may start at a start value and count downwards to zero. At step 106, the processor 16 determines if the timer 20 has expired. The timer 20 may expire, for example, when the timer 20 has finished counting up to a limit or has counted down to zero from a start value. If the timer 20 has not expired, then the timer 20 continues to run, i.e. count up or down, for example, at step 110 and the timer is checked again at step 106.

When the timer 20 has expired, the processor 16 activates the audio alert device 12 and stops the timer 20 from running, such as stopping the timer 20 from counting up or down at step 108. The audio alert device 12 upon being activated may produce a sound, such as a beep or series of beeps or such as a message that four-wheel drive has been engaged for too long a time period.

The limit for the timer 20 may, for example, be three minutes. In that case the audio alert device 12 would be activated and produce an audio alert or sound after the four wheel drive device 18 has been engaged for three minutes.

When the vehicle ignition device 22 is turned off, the processor 16 may set the timer 20 back to the start value in a count down situation, or back to zero, in a count up situation.

FIG. 3 shows a flow chart 200 of another method in accordance with another embodiment of the present invention. At step 202 the processor 16 may determine if a driver of the subject vehicle has engaged four-wheel drive. The processor 16 may receive a signal from the four-wheel drive device 18 over busses or communications lines 18a and 16a from the four-wheel drive device 18. If the driver of the subject vehicle has not engaged four-wheel drive, the processor 16 periodically repeats step 202 until the driver engages four-wheel drive.

If the driver of the subject vehicle has engaged four-wheel drive, a signal is sent from the four-wheel drive device 18 to the processor 16 indicating that four-wheel drive has been engaged. In response to this signal, the processor 16 starts the distance counter 14 at step 204. The distance counter 14 may, for example, start at zero and count the distance traveled by the subject vehicle (or determine the distance traveled from a source such as an odometer, or the distance counter itself may include the odometer) up to a limit or may start at a start value and count downwards towards zero with distance traveled by the subject vehicle. At step 206, the processor 16 determines if the distance counter 14 has reached its limit (or counted down to zero). The distance counter 14 may expire, for example, when the distance counter 14 has finished counting up to a limit or has counted down to zero from a start value. If the distance counter 14 has not expired, then the distance counter 14 continues to run, i.e. count up or down, with the distance traveled by the subject vehicle, for example, at step 210 and the distance counter 14 is checked again at step 206.

When the distance counter 14 has reached its limit (or zero), the processor 16 activates the audio alert device 12 and stops the distance counter 14 from running, such as stopping the distance counter 14 from counting up or down at step 208. The audio alert device 12 upon being activated may produce a sound, such as a beep or series of beeps or such as a message that four-wheel drive has been engaged for too long a time period.

The distance limit for the distance counter 14 may, for example, be three miles. In that case the audio alert device 12 would be activated and produce an audio alert or sound after the subject vehicle has traveled three miles with the four wheel drive device 18 engaged.

When the vehicle ignition device 22 is turned off, the processor 16 may set the distance counter 14 back to the start value in a count down situation, or back to zero, in a count up situation.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
an audio alert device;
a timer;
a processor; and
a four-wheel drive device for a subject vehicle;
wherein the processor activates the timer when the four wheel drive device indicates that the subject vehicle has been placed in a four wheel drive state; and
wherein the processor activates the audio alert device so that the audio alert device produces a sound when the timer has reached a limit.

2. The apparatus of claim 1
wherein the limit is zero and the timer counts down to reach the limit.

3. The apparatus of claim 1
wherein the limit is a value and the timer counts up to reach the limit.

4. The apparatus of claim 1 further comprising
an ignition device for starting the subject vehicle; and
wherein the processor resets the timer to a start value when the ignition device is turned off.

5. The apparatus of claim 1
wherein the limit is zero and the distance counter counts down with distance traveled by the subject vehicle to reach the limit.

6. The apparatus of claim 1
wherein the limit is a value and the distance counter counts up with distance traveled by the subject vehicle to reach the limit.

7. The method of claim 1 further comprising
resetting the timer to a start value when an ignition device is turned off.

8. An apparatus comprising:
an audio alert device;
a distance counter;
a processor; and
a four-wheel drive device for a subject vehicle;
wherein the processor activates the distance counter when the four wheel drive device indicates that the subject vehicle has been placed in a four wheel drive state; and
wherein the processor activates the audio alert device so that the audio alert device produces a sound when the distance counter has reached a limit.

9. The apparatus of claim 8 further comprising
an ignition device for starting the subject vehicle; and
wherein the processor resets the distance counter to a start value when the ignition device is turned off.

10. A method comprising:
activating a timer when a four wheel drive device indicates that a subject vehicle has been placed in a four wheel drive state; and
activating an audio alert device so that the audio alert device produces a sound when the timer has reached a limit.

11. The method of claim 10
wherein the limit is zero and the timer counts down to reach the limit.

12. The method of claim 10
wherein the limit is a value and the timer counts up to reach the limit.

13. A method comprising:
activating a distance counter when a four wheel drive device indicates that a subject vehicle has been placed in a four wheel drive state; and
activating an audio alert device so that the audio alert device produces a sound when the distance counter has reached a limit.

14. The method of claim 13
wherein the limit is zero and the distance counter counts down with distance traveled by the subject vehicle to reach the limit.

15. The method of claim 13
wherein the limit is a value and the distance counter counts up with distance traveled by the subject vehicle to reach the limit.

16. The method of claim 13 further comprising
resetting the distance counter to a start value when an ignition device is turned off.

* * * * *